Aug. 21, 1928.
J. H. HAMMOND, JR
1,681,293
SYSTEM AND METHOD FOR THE TRANSMISSION OF RADIANT ENERGY
Original Filed March 17, 1917   6 Sheets-Sheet 3
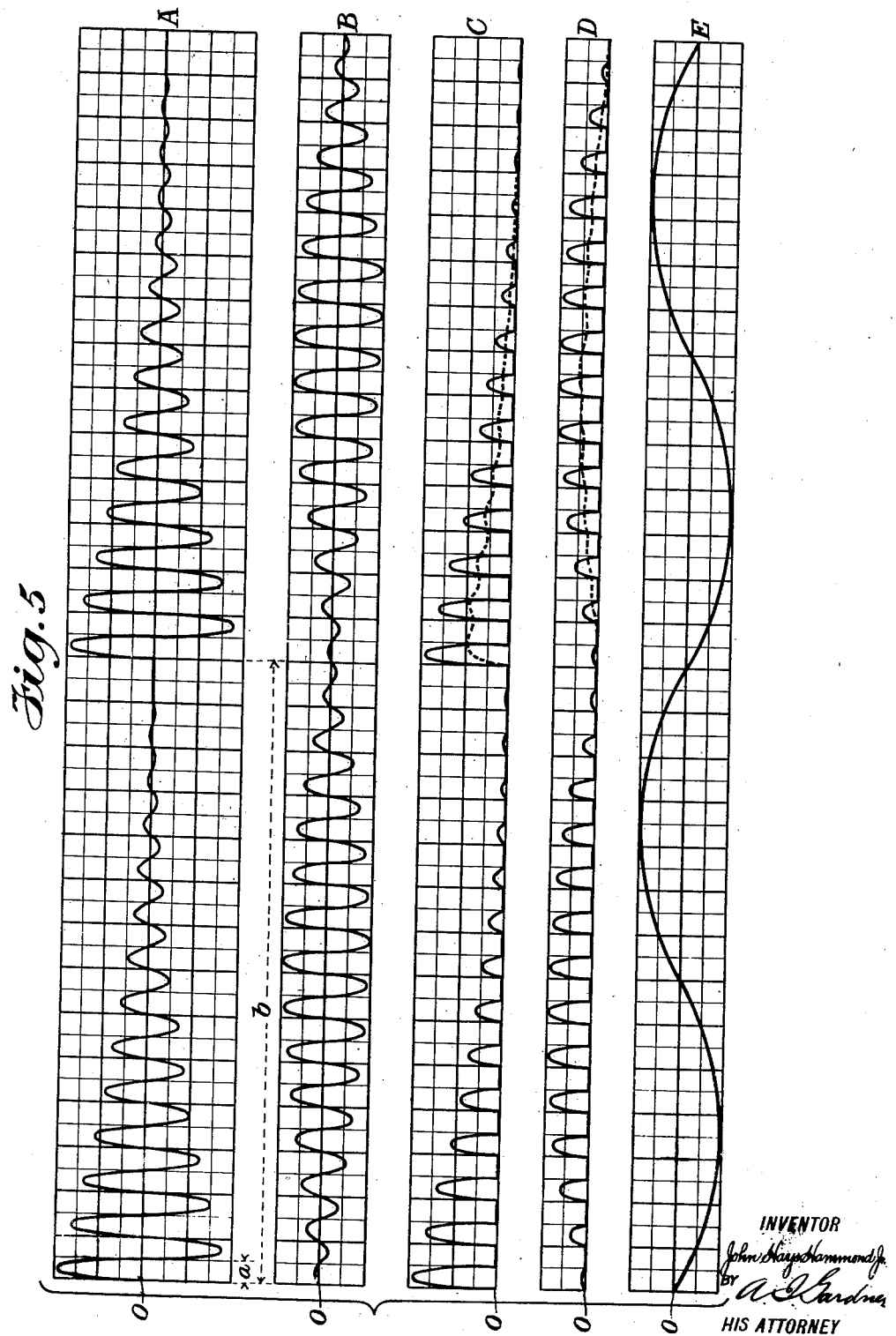
INVENTOR
John Hays Hammond Jr.
BY
A. G. Gardner
HIS ATTORNEY

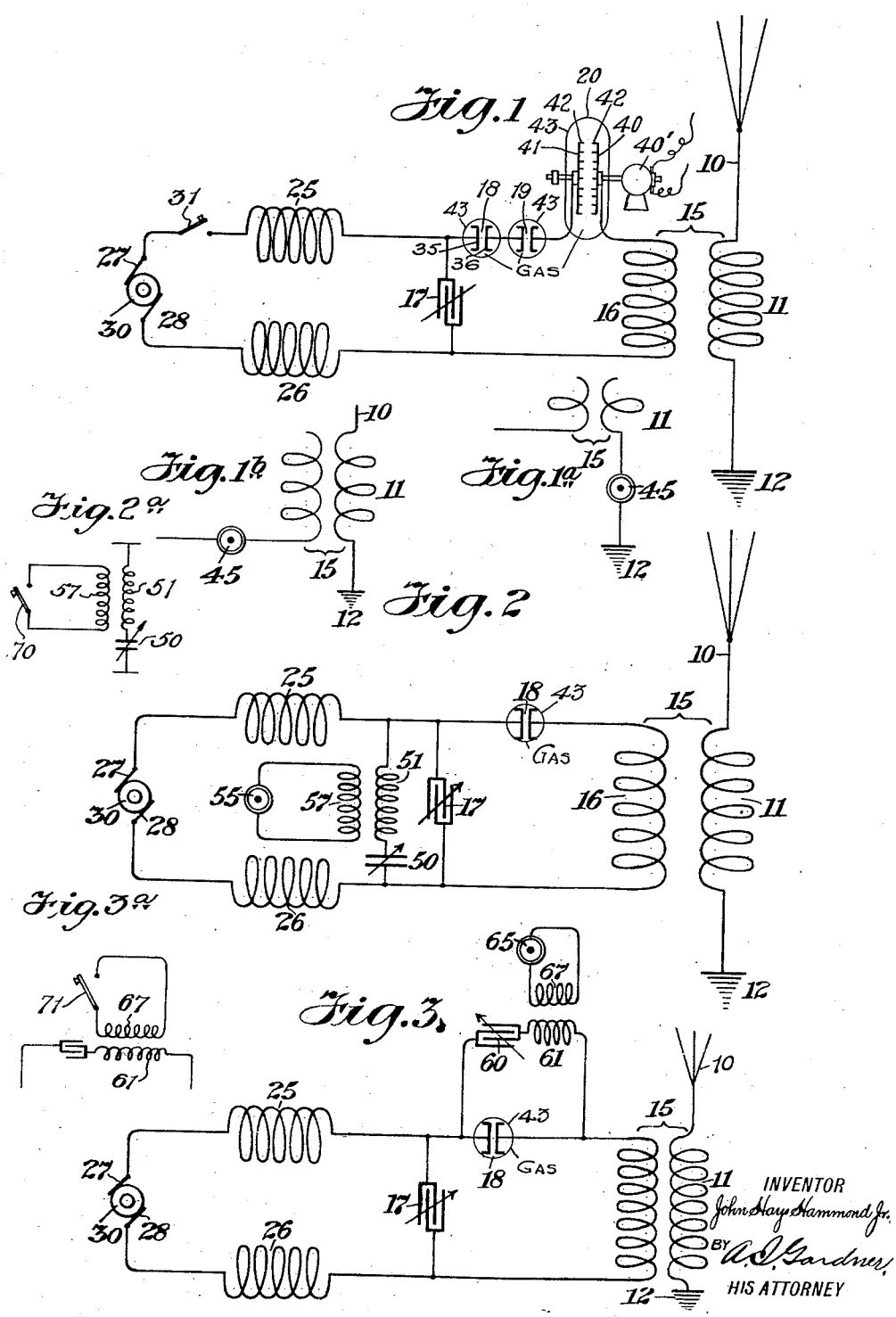

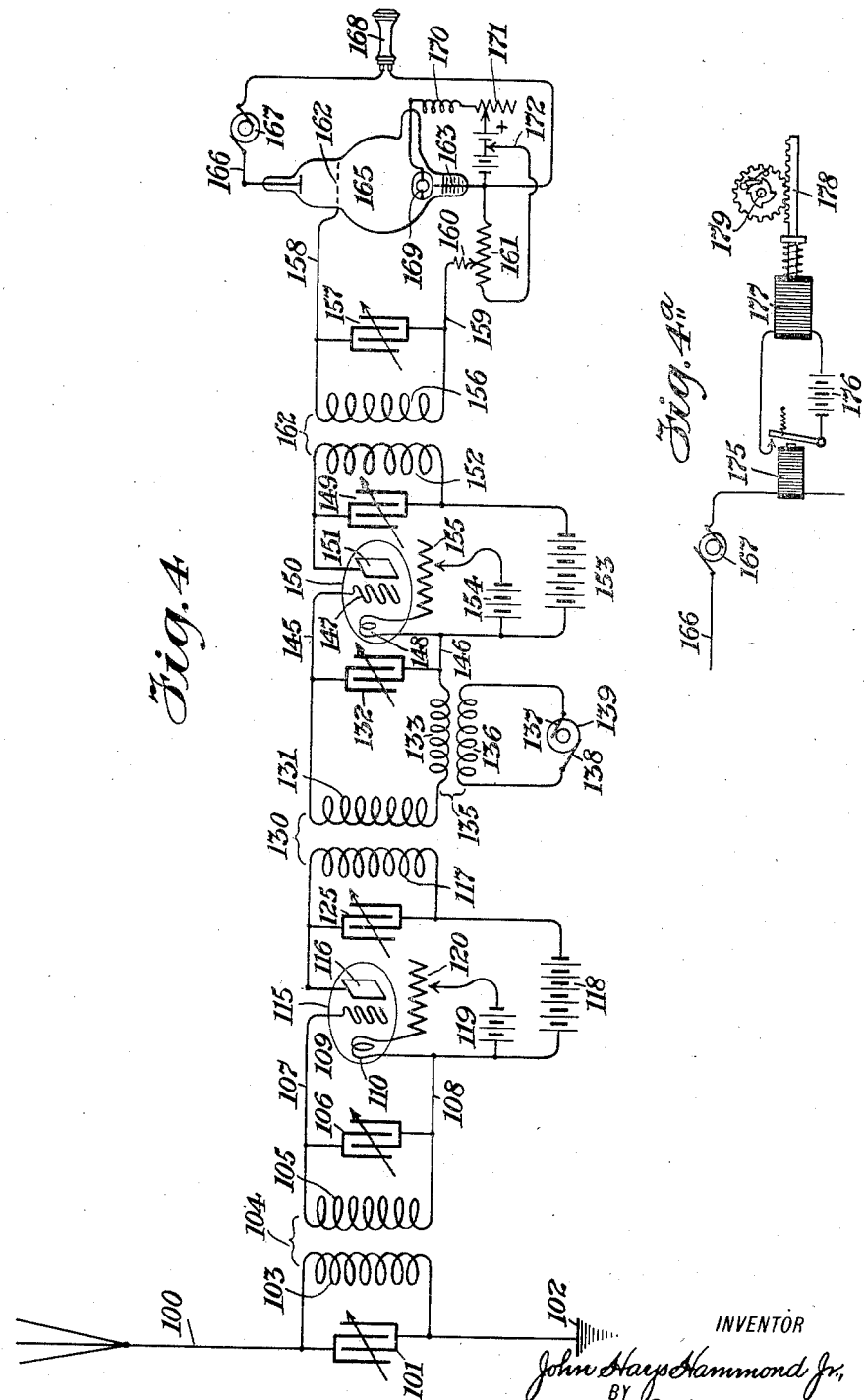

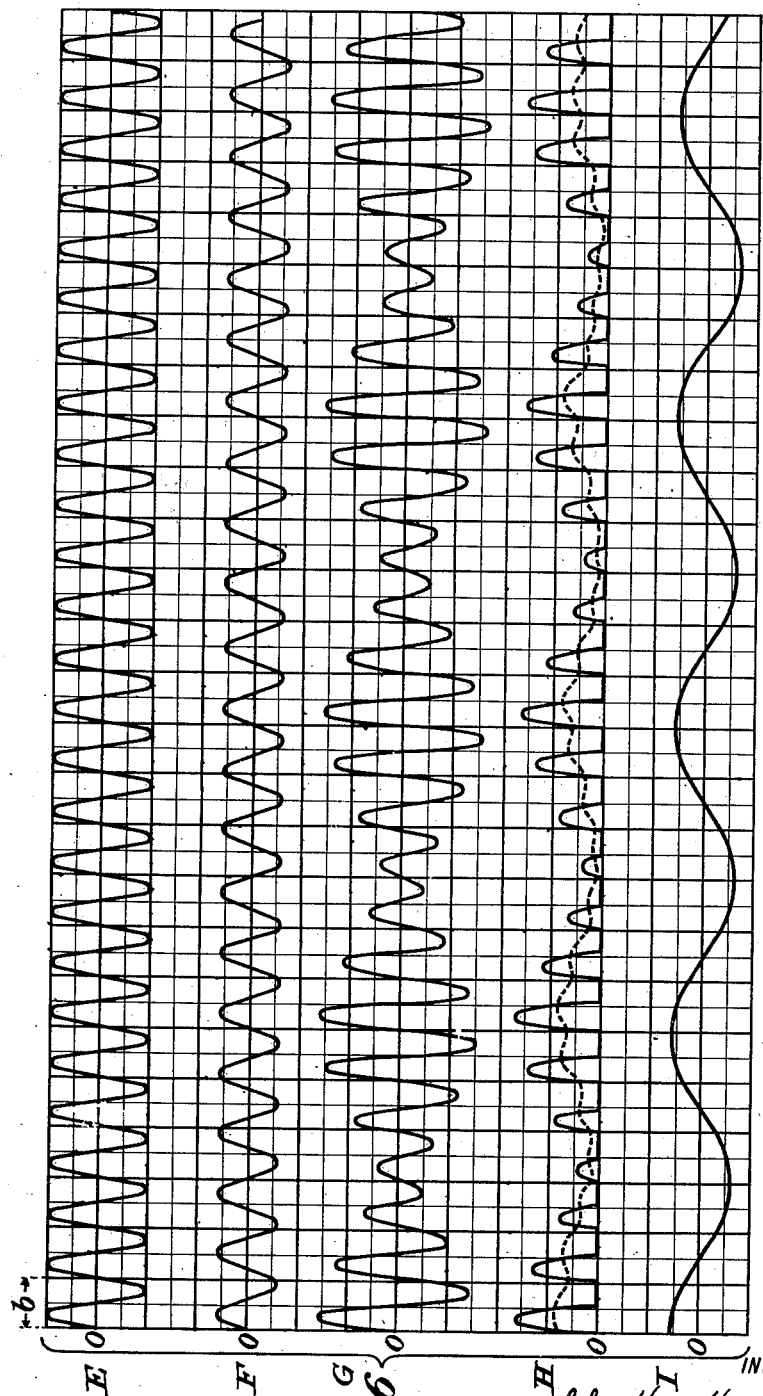

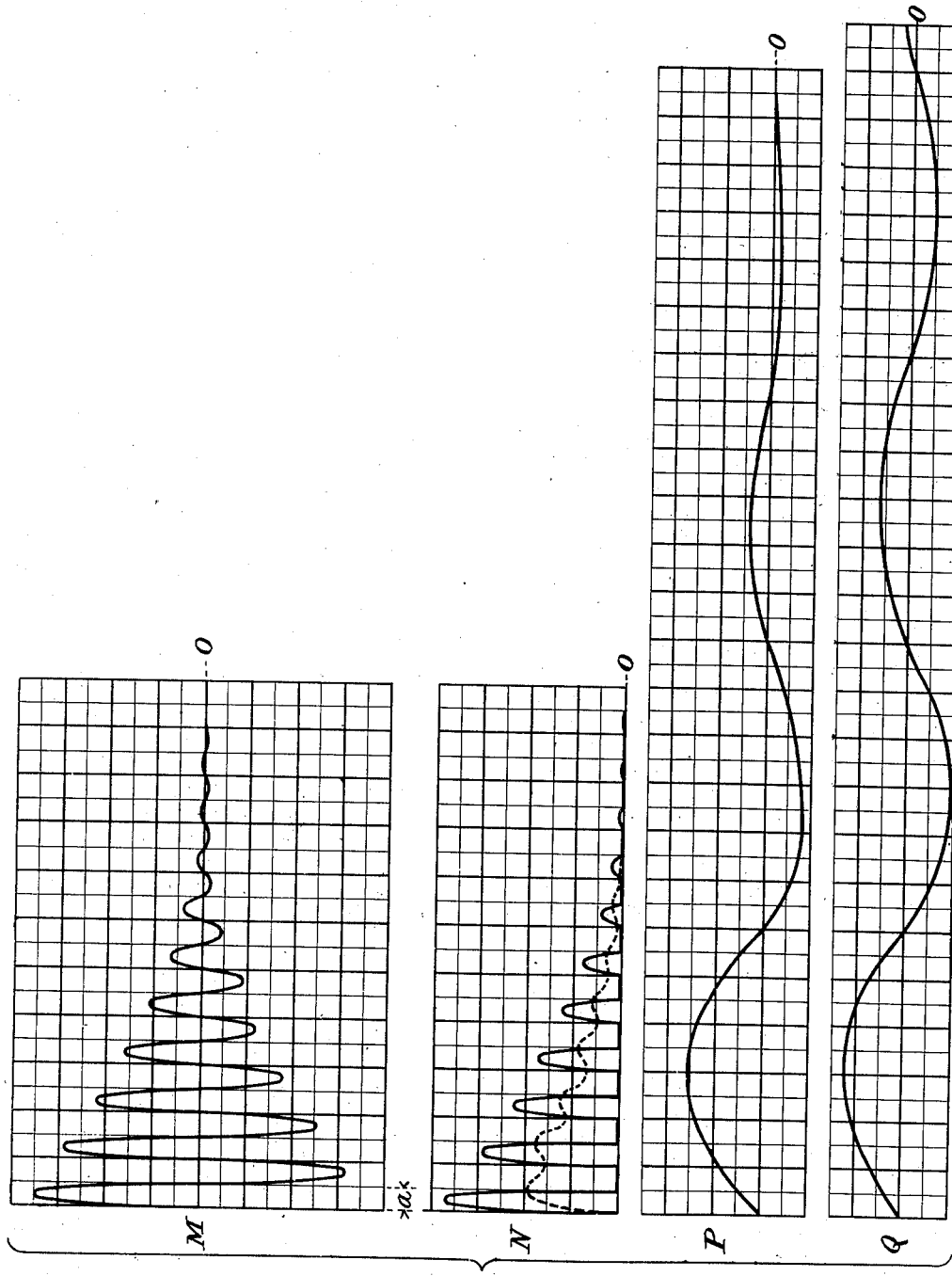

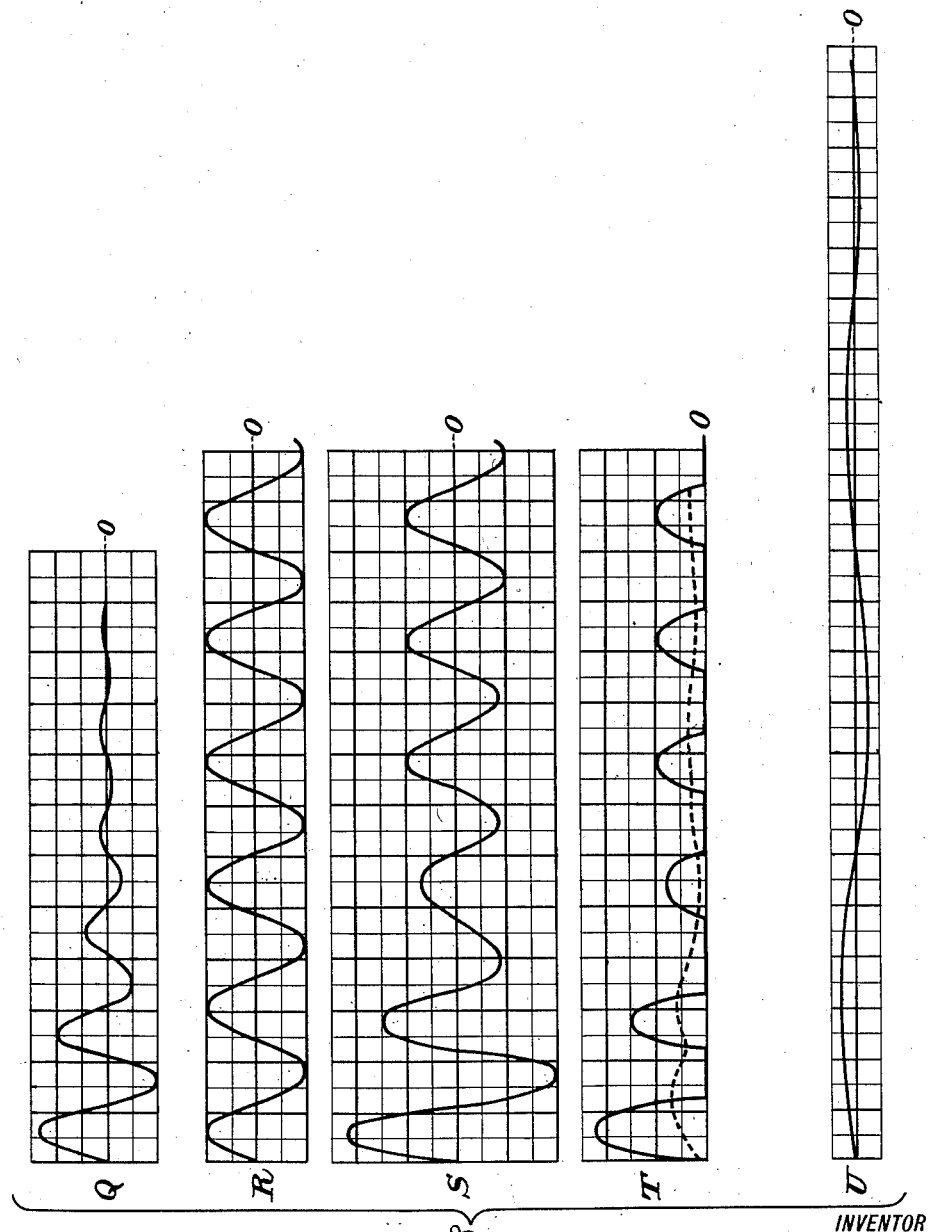

Patented Aug. 21, 1928.

1,681,293

UNITED STATES PATENT OFFICE.

JOHN HAYS HAMMOND, JR., OF GLOUCESTER, MASSACHUSETTS.

SYSTEM AND METHOD FOR THE TRANSMISSION OF RADIANT ENERGY.

Application filed March 17, 1917, Serial No. 155,500. Renewed January 7, 1928.

The various selective systems used for the transmission of radiant energy may be divided into two main classes, first, those systems which are intended to be used only when there is little, if any, probability that any wilful effort will be made to interfere with the operation of the systems, and second, those systems which are intended to be successfully operated even while extreme efforts are being exerted for the purpose of interfering with the operation of the systems.

The first class of systems or methods may be used when there is no desire for secrecy, or when secrecy is not of prime importance. The second class is used when it is desirable or necessary to avoid any interference from another station.

In the control of radio dynamic torpedoes, the most stringent requirements for selectivity obtain, in view of the fact that it is necessary to be able to control the torpedo in response to radiant energy from a distant station, and while the torpedo is in very close proximity to a hostile source of radiant energy through the action of which every possible effort may be made to interfere with the operation of the torpedo. In the operation of many of the selective systems heretofore used, including systems provided with static preventers, means for providing beats, etc., it has been found possible under some conditions to interfere by subjecting the systems to shock effects produced by the irregular discharge of a powerful source of radio interference located sufficiently near to the system acted upon. In the control of a radio dynamic torpedo, the ratio between the magnitude of the energy of interference and the magnitude of the energy of the received signal may be as great as fifty to one, or greater, when the torpedo is close to the interfering station of the enemy vessel, and relatively distant from the transmitting or control station, and under such conditions, it has been found that many of the selective receiving systems heretofore devised are not proof against interference by radio shock effects produced by the nearer station.

Some of the objects of this invention are to provide an improved selective system for the transmission and reception of radiant energy; to provide an improved selective system for the transmission and reception of radiant energy particularly adapted for use in the control of radio dynamic torpedoes or other valuable bodies; to provide an improved selective system of radio telephony; to provide an improved transmission system for radiant energy; to provide an improved receiving system for radiant energy; to provide an improved system for the transmission and reception of radiant energy which will be proof against interference under extremely adverse conditions; and to provide other improvements as will appear hereinafter.

In the accompanying drawings, Figs. 1, 2 and 3 are diagrammatic elevations respectively of three forms of transmission stations constructed in accordance with this invention; Figs. 1ª and 1ᵇ are fragmentary diagrammatic elevations of modifications of the systems shown in Figs. 1, 2 and 3; Figs. 2ª and 3ª are fragmentary diagrammatic elevations showing a modification of Figs. 2 and 3 respectively. Fig. 4 is a diagrammatic elevation of a receiving station constructed in accordance with this invention; Fig. 4ª is a fragmentary diagrammatic elevation showing a modified form of a portion of the same; and Figs. 5, 6, 7 and 8 are diagrammatic representations of the oscillations produced in the operation of the improved systems shown in Figs. 1 to 4.

Referring to the drawings, and particularly to Fig. 1, one embodiment of this invention includes a station or system for the transmission of radiant energy, comprising an open aerial circuit consisting of an antenna 10 having in series therewith a coil 11, and which is grounded in any well known or suitable manner as at 12. The coil 11 forms the secondary of an ordinary oscillation transformer 15, having a primary coil 16 which is arranged in a closed oscillatory circuit including a variable condenser 17, and one or more spark gap devices, three being shown and numbered 18, 19 and 20. The opposite sides of the condenser 17 are connected respectively through two choke coils 25 and 26 with the two terminals or brushes 27 and 28 of a direct current generator 30 or other source of electric current preferably constructed and operated so as to produce a uniformly high potential, for instance, of four thousand volts of direct current. A key 31 is inserted in the circuit leading from the generator 30 to be used in controlling the current from the generator to send telegraphic signals.

Each of the spark-gap devices 18 and 19 is of a well known construction, and includes a pair of stationary, parallel plates 35 and 36 of metal or other conducting material which are suitably spaced apart and insulated one from the other. The third spark gap device 20, is of any well known or suitable construction, and comprises two parallel coaxial conducting discs 40 and 41 which are suitably spaced apart and insulated one from the other. One of these discs 41 is stationary, while the other disc 40 is arranged to be rotated at a predetermined and uniform rate about the common axis of the two discs 40 and 41 by any suitable means, as for instance, by any suitable constant speed electric motor 40'. The two discs 40 and 41 are provided marginally upon their inner surfaces with radial teeth or segmental projections 42 integral with the discs 40 and 41 respectively which are equispaced and which are so arranged that when the rotatable disc is in a given position the teeth or projections 42 upon the rotatable disc will be opposite the teeth or projections 42 upon the stationary disc. The thickness of each tooth 42 is preferably not greater than one-third the distance between successive teeth on the same disc. The two discs 40 and 41 are provided with the same number of teeth and with such a number that when the rotatable disc 40 is rotated at a predetermined rate, the teeth 42 of the rotatable disc will be brought opposite to the teeth 42 of the stationary disc at a predetermined rate, preferably at a rate above audibility, for instance, at a rate of about thirty thousand times per second so that the passage of the current from one of the discs 40 to the other disc 41 will be interrupted accordingly, that is to say, at about thirty thousand interruptions per second.

Each of the spark gap devices, 18, 19 and 20, is preferably surrounded in a well known manner by a suitable container 43, and the space between each pair of plates is preferably filled in a well known manner by an atmosphere of hydrogen, coal gas or other gas or vapor, which as is well known, will increase the quenching action of the gaps.

In the operation of the transmission system shown in Fig. 1, the variable condenser 17 is charged from the source of high potential 30 acting through the choke coils 25 and 26. When the potential of the variable condenser 17 has risen sufficiently high, a current rush will be permitted to flow through the gap system 18, 19 and 20 whenever the teeth 42 of the rotatable disc 41 are opposite or approximately opposite the teeth 42 of the stationary disc 40. This periodic rush of the current through the gap devices 18, 19 and 20 at the predetermined rate, for instance, of 30,000 impulses per second, will pass through the primary coil 16 and cause the primary coil 16 to act inductively upon the secondary coil 11 to cause the open aerial circuit 10—11 to oscillate in its own free period, for instance, of 1,000,000 cycles per second, which will be referred to hereinafter as the "radiation frequency" of the system.

Between each rush of the current through the gap system 18, 19 and 20, the oscillations in the open aerial circuit 10—11 will die down until a succeeding impulse or rush of current is permitted to flow through the gap system. By the time the second impulse has arrived, the oscillations in the aerial circuit due to the preceding impulse have virtually ceased. Successive repetitions of this process will cause groups of damped waves or electroradiant oscillations to be emitted from the aerial circuit 10—11 into the surrounding space, the groups following each other at a rate predetermined by the number of teeth on each of the discs 40 and 41, and the rate of rotation of the rotatable disc 40, for instance, a rate of 30,000 groups per second as shown diagrammatically by the full curved line in graph A of Fig. 5. This group frequency will be referred to hereinafter as the "secondary frequency" or "group frequency" of the system.

The system shown in Fig. 1 may be adapted for the transmission of wireless telephony by introducing a telephonic transmitter or microphone 45 either in the open aerial circuit 11 in a well known manner, as shown in Fig. 1ª, or in the closed oscillatory circuit 16, 17, 18, 19 and 20 in a well known manner, as shown in Fig. 1ᵇ. In either of these cases, the whole complex wave emitted by the open aerial circuit 10—11 will be modified by having impressed thereon irregular electroradiant undulations corresponding to sound waves whenever the microphone transmitter 45 is acted upon by the voice of an operator. Such a radiated wave could be received by the ordinary wireless receiving station (consisting of an antenna, coupling coil, ground, coupled secondary and detector) and the telephonic message heard. If, however, instead of modifying or modulating the entire wave emitted by the open aerial circuit, the secondary frequency alone is modulated, as will appear hereinafter, then the telephonic message could be received only by a receiving system constructed particularly for this purpose, as will appear hereinafter.

The modified form of transmission station shown in Fig. 2 is similar in construction and operation to that just described in connection with Fig. 1, except that instead of producing the lower or secondary frequency of, for instance 30,000 per second, by means of a rotary spark gap device such as the device 20 shown in Fig. 1, this secondary frequency is produced by means of a "tone circuit" including a variable condenser 50 and an inductance 51 which are arranged in series across the hereinbefore described variable condenser 17, as shown in Fig. 1. In this modified form, the hereinbefore described rotary gap device 20 is omitted, and the variable condenser 50 and the inductance 51 of the tone circuit are adjusted to have the desired frequency, preferably above audibility, for instance, of 30,000 cycles per second. In this form of the invention the oscillations emitted by the open aerial circuit 10—11 would have a frequency, for instance, of 1,000,000 per second, and would be regularly increased and decreased in amplitude at a rate determined by the tone circuit 50, 51, for instance, every thirty-thousandth part of a second, and under ideal conditions, the form of the wave emitted by the aerial circuit 10—11 would be approximately as shown by the full curved line in graph B of Fig. 5.

In Fig. 2 is also shown an arrangement whereby the transmission system may be used for wireless telephony, a telephone transmitter or microphone 55 being arranged in a circuit consisting of a primary coil 57, the coil 57 being closely coupled to and arranged to act inductively upon the coil 51 of the tone circuit 50—51. When the telephone transmitter 55 is acted upon by the voice of an operator, the resistance of the circuit 57—55 is varied corresponding to the frequency of the sound of the human voice which in turn causes corresponding variations in the equivalent impedance of the secondary coil 51, and hence of the natural period of oscillation of the tone circuit 50—51. This action is in effect identical with the partial short circuiting of some of the turns of the coil 51. The radiated energy is of the character shown by curve B of Fig. 5, but instead of the secondary frequency remaining constant, as in the system previously described and represented in Fig. 1, the rapidity of the variation of the secondary frequency corresponds to the frequency of the sound waves falling upon the transmitter 55, and the amount of the variation depends upon the intensity of the sound waves.

The modified form of transmission system shown in Fig. 3 is similar in construction and operation to the system shown in Fig. 1, except that instead of producing the secondary frequency of for instance 30,000 per second, by means of the rotatable spark gap 20, this rotatable gap device is omitted, and instead there is substituted a tone circuit comprising a variable condenser 60 and an inductance 61 arranged in series across the hereinbefore described non-segmented or stationary gap device 18. The variable condenser 60 and the inductance 61 of the tone circuit are adjusted so as to have a natural frequency, preferably above audibility, for instance, of 30,000 cycles per second. Under ideal conditions, the form of the wave emitted by the open aerial circuit 10—11 of Fig. 3 when used for wireless telegraphy would be approximately as shown in graph B of Fig. 5.

In this modified system shown in Fig. 3, there is also provided means for utilizing the system in transmitting wireless or electroradiant telephone messages. For this purpose, a telephone transmitter or microphone 65 is arranged with a coil 67, the coil 67 being arranged to act inductively upon the coil 61 of the tone circuit. When the voice of an operator acts upon the telephone transmitter 65, the device operates essentially in the same manner as the system shown in Fig. 2, and described hereinbefore.

Either of the systems shown in Figs. 2 and 3 may be adapted for use in sending secret wireless telegraph messages by substituting for the telephone transmitter 55 of Fig. 2, a key 70 as shown in Fig. 2ª, or for the telephone transmitter 65 of Fig. 3 a telegraph key 71 arranged to open and close the corresponding circuit, as shown in Fig. 3ª.

When either wireless telephone messages or wireless telegraph messages are transmitted by either of the systems shown in Figs. 2 or 3 through the operation of the telephone transmitters 55 or 65 or telegraph keys substituted therefor, such messages could be received only upon a receiving system particularly adapted for that purpose, and constructed, for instance, in a manner similar to that hereinafter described.

One form of receiving system constructed in accordance with this invention, comprises as shown diagrammatically in Fig. 4, an open aerial circuit including an antenna 100 which has in series therewith a variable condenser 101, and which is grounded in any suitable manner as at 102. A coil 103 is shunted around the variable condenser 101 and forms the primary of a transformer 104, the secondary coil 105 of which is in a closed oscillatory circuit with a variable condenser 106. This closed circuit 105—106 and the closed circuit 101—103 by which it is controlled, are tuned to the "radiation frequency" of the incoming waves as will appear hereinafter.

From the terminals of the variable condenser 106, leads 107 and 108 run respectively to the grid 109, and the filament 110 of a primary gaseous or ionic detector 115 of any well known or suitable construction. This detector 115 is provided with the usual plate or terminal 116, and is arranged to control a circuit including a coil 117 and a battery 118 or other source of energy. A battery 119 is arranged to heat the filament 110 through a variable resistance 120. A variable condenser 125 has its opposite terminals connected to the opposite ends of the coil 117, and forms therewith a closed oscillatory circuit which is tuned to the secondary frequency of the incoming waves, as will appear hereinafter.

The coil 117 forms the primary of a transformer 130, the secondary coil 131 of which is in a closed oscillatory circuit which includes a variable condenser 132 and a coil 133, and which is tuned to respond to the closed circuit 117—125 by which it is controlled, that is to say, to the secondary frequency of the incoming wave.

For the purpose of producing "beats" in the closed oscillatory circuit 131, 132, 133, the coil 133 forms the secondary of a transformer 135, the primary coil 136 of which is in an auxiliary closed circuit arranged to be energized by any suitable source of continuous oscillations having a frequency differing somewhat, for instance, by five hundred cycles per second from the secondary frequency of the system which has been taken, for example, as 30,000 per second. For instance, the opposite ends of the coil 136 may be connected to the brushes 137 and 138 of an alternating current generator 139, which is driven at a constant speed to produce oscillations of the desired frequency, for instance, of 29,500 cycles per second, when the secondary frequency of oscillations in the closed circuit 131—132 is 30,000 per second.

The opposite terminals of the variable condenser 132 are connected by leads 145 and 146 to the grid 147 and the filament 148 of a secondary gaseous detector 150 of any well known or suitable construction. This detector 150 includes the usual plate or terminal 151, and is arranged to control a circuit including a coil 152 and a battery 153 or other source of electrical energy. A battery 154 is arranged to heat the filament 148 through a variable resistance 155. A variable condenser 149 has its opposite terminals connected to the opposite ends of the coil 152, and forms therewith a closed oscillatory circuit which is tuned to the frequency of the preponderating component or "beat frequency" of the oscillations in the control circuit 131, 132, 133, as will appear hereinafter. The coil 152 forms the primary of a transformer 162, the secondary coil 156 of which is in a closed oscillatory circuit including a variable condenser 157, and which is tuned to respond to the frequency of the controlling circuit 152—149.

The closed oscillatory circuit 156, 157 may be arranged in any well known or suitable manner to control any well known or suitable detector arranged in any well known or suitable manner to control any suitable receiving instrument or device. For instance, the two terminals of the condenser 157 may be connected respectively by a lead 158, and by a lead 159, high resistance 160, and variable resistance 161, to the grid 162 and the lower terminal 163 of a mercury vapor detector 165 of well known construction. The detector 165 is arranged to control a circuit 166, including a high frequency alternating current generator 167, preferably having a frequency above audibility, and a telephone receiver 168 or other suitable receiving device or instrument. The detector has an annular metal anode 169 which is connected through a choke coil 170 and variable resistance 171 to the positive pole of a battery 172, the negative pole of which is connected to the lower terminal 163 of the detector.

The receiving instrument 168 may be a telephone receiver or any other suitable device. For instance, when it is desired to use this system in the control of a torpedo or other movable body, the receiving device 168 might be in the form of a relay 175 as shown in Fig. 4ª arranged to control a normally open circuit including a battery 176, and a solenoid 177, arranged to reciprocate a rack 178 to rotate a valve stem 179 step by step in one direction to control the direction of movement of the torpedo, and to control the operation of various devices upon the torpedo in any suitable manner, for instance, as shown and fully described in many of applicant's prior applications.

When it is desired to utilize the receiving system shown in Fig. 4 for receiving wireless telegraph messages, the alternating current generator 139 is preferably rotated at such a rate as to produce in combination with the incoming waves in the adjacent circuit 131, 132, 133, beats having a frequency that will give the maximum audibility at the telephone receiver 168, for instance having a frequency of approximately 500 per second. But when it is desired to utilize the receiving system shown in Fig. 4 for receiving wireless telephone messages, the alternating current generator 139 is preferably rotated at such a rate as to give in the circuit 131, 132, 133, a beat frequency above the range of audibility for the ordinary operator, or at least to give a beat frequency of several thousand per second.

The operation of the receiving system shown in Fig. 4 is diagrammatically illustrated in Figs. 5 to 8 by the graphs A, B, C, D, E, F, G, H, I, M, N, P, Q, R, S, T and U. In these graphs, zero amplitude is indicated in each case by a horizontal line marked "0", and variations in the vertical direction are intended to indicate approximately variations of electric-field-strength, of magnetic-field strength, of electric current, or of electromotive force, whichever quantity happens to be in discussion. Also, in these graphs the passage of time is indicated by the horizontal distance in any case measured from left to right. The horizontal distance "$a$" (see Figs. 5 and 7) may indicate for instance the millionth of a second periodicity, and the length "$b$" for instance the thirty-thousandth of a second periodicity hereinbefore mentioned. For convenience in illustration, the graphs in Fig. 6 have been compressed horizontally, so that a given length of time, for instance, the thirty-thousandth part of a second, indicated by distance $b$ in Fig. 5 is indicated by a much shorter horizontal distance $b$ in Fig. 6. The curved line in graph E of Fig. 5 and the curved line in graph E of Fig. 6 are intended to represent the same current fluctuation. Also for convenience in illustration the graphs in Fig. 8 are compressed horizontally, the graph Q of Fig. 7 and the graph Q of Fig. 8 being intended to represent the same wave or current fluctuation.

When a series of electromagnetic waves or oscillations of the type shown approximately by the curved line in graph A of Fig. 5 is emitted by the transmitting station shown in Fig. 1, or when a series of electromagnetic waves or oscillations of the type shown by graph B in Fig. 5 is emitted by either of the transmission stations shown in Figs. 2 and 3, the open aerial circuit 100, 101, 102 of the receiving system shown in Fig. 4 will be caused to oscillate in a similar manner, and the curved line of graph A Fig. 5 or of graph B Fig. 5, depending upon which of the two forms of waves are received, may be considered as representing approximately the oscillations of the receiving antenna circuit 100, 103, 101, 102. Since the coil 103 is inductively coupled to the coil 105, a correspondingly fluctuating electric current will be caused to flow in the closed oscillatory circuit 105, 106. The antenna circuit 103—101, and the closed circuit 105—106, and the coupling between the coils 103 and 105 are given the optimum resonance adjustment to the "radiation frequency" of the incoming wave. The result of the procedure so far is that the potential across the terminals of the condenser 106 will be caused to fluctuate in accordance with graph A or graph B of Fig. 5 (depending upon the form of the received waves as hereinbefore described). The electrical inertia of the inductance coils 103—105 will have the effect of "smoothing-out" any abruptnesses or irregularities of the incoming wave, and furthermore, an impinging wave of the type shown in graph A of Fig. 5 will manifest itself in potential fluctuations of the condenser 106 which will approach the form shown in graph B of Fig. 5 in character. Under the condition of zero potential difference between the terminals of the condenser 106, the temperature of the filament 110 and the potential of the battery 118 are adjusted so that a certain steady current of electricity flows through the battery 118, and the coil 117, and the conducting space between the plate 116 and the filament 110. The effect of a fluctuation of potential of the grid 109 is to cause fluctuations of the current through the controlled circuit including the battery 118, coil 117, plate 116 and filament 110. It is characteristic of a gaseous detector that it may be adjusted so that a symmetrical fluctuation of the potential of the grid will give rise to an unsymmetrical fluctuation of the current through the controlled circuit (battery 118, coil 117, plate 116 and filament 110); and the result of a series of symmetrical fluctuations of the grid potential (considering time average) may be a net change of the current through the controlled circuit. This net change may be positive, negative or zero depending upon the adjustment of the detector. This action is, in effect, one of rectification, and under proper conditions may be accompanied by an amplification effect. This characteristic behavior of the gaseous detector is of course, well known.

The result to this point of the process is that the current through the controlled circuit 118, 117, 116, 110 fluctuates substantially in accordance with the rectified received waves, as shown in graphs C and D of Fig. 5 in which the heavy full lines indicate the ideal rectification respectively for the two different forms of incoming waves shown in graphs A and B. This ideal rectification is in practice smoothed out by the large electrical inertia of the inductance coil 117 of the controlled circuit, giving current variations such as are shown approximately by the dotted lines at the right half of graphs C and D respectively. One of these dotted lines will therefore represent approximately the actual current fluctuations in the controlled circuit and consequently in the inductance coil 117, depending upon whether the incoming wave is in the form shown in graph A or in the form shown in graph B, but in either case the preponderating component of the current fluctuation in the coil 117 is a simple harmonic fluctuation having the period of the "secondary frequency" of the incoming wave, as shown approximately by the full curved line in graph E of Fig. 5. If then the coil 117 and the condenser 125 are so adjusted that the natural period of the circuit 117—125 is that of the "secondary frequency" of the incoming wave, this circuit will "build up" under the action of the current fluctuations indicated by the dotted lines in graph C or graph D, and give rise to strong current fluctuations of the type shown in graph E of Fig. 5. These current fluctuations will act inductively through the coil 117 upon the coil 131 and will give rise to current fluctuations in the circuit 131, 132, 133. The values of the inductance 131, the inductance 133 and the variable condenser 132 are so adjusted that the natural period of the circuit through these elements will be adjusted to the current fluctuations impressed upon it from the coil 117—that is to say, to the period of the "secondary frequency." The current fluctuations in this circuit due merely to the influence of coil 117 would also be represented by the graph E of Fig. 5, and would differ from those in the coil 117, only in being of a more nearly sinusoidal form.

The current oscillations produced by source 139 in the primary coil 136 of the auxiliary circuit 136, 139, have as hereinbefore described, a frequency different somewhat, say for instance, by 500 cycles per second from the periodicity of the fluctuations in the circuit 131, 132, 133, caused by the inductive action of the coil 117 of the preceding controlled circuit. These fluctuations in the primary coil 136 act inductively through the secondary coil 133 upon the circuit 131, 132, 133. In the absence of all other effects this will give rise to a current fluctuation in the latter circuit of the type shown by the full curved line in graph F of Fig. 6. This current fluctuation shown in graph F compounds with the current fluctuation shown in graph E, and the two series of fluctuations combine in the form of a single series of fluctuations indicated approximately by the full curved line in graph G of Fig. 6. The potential at the terminals of the condenser 132 will therefore be caused to fluctuate substantially in accordance with this full curved line of graph G of Fig. 6, and this fluctuation of potential at the terminals of the condenser 132 will act upon the filament and grid of the secondary gaseous detector 150 in a manner similar to that hereinbefore described in connection with the action of the variable condenser 106 upon the grid 109 and filament 110 of the primary detector 115. This action of the condenser 132 upon the secondary detector 150 will cause, as hereinbefore described, fluctuations in the current of the corresponding controlled circuit 152, 151, 148 and 153. The ideal current fluctuation in this circuit controlled by the secondary detector 150 is indicated approximately by the heavy full line in graph H, while the dotted curved line in graph H represents approximately the true fluctuation of the current which, owing to the "smoothing out" effect of the large inductance of the coil 152, varies from the ideal rectification. The preponderating component of the dotted curve of graph H of Fig. 6 is a simple periodic fluctuation, having the frequency indicated by the curved line in graph I of Fig. 6, and is clearly of the frequency of the envelope of the full curved line in graph G of Fig. 6, which evidently is the frequency of the "beats" produced by the action of the oscillations in the auxiliary circuit 136—139 upon the oscillations of the "secondary frequency" in the closed circuit 131, 132, 133. If the inductance 152 and the variable condenser 149 are adjusted so that the natural period of the circuit through these elements is that of its preponderating component indicated by the curved line of graph I of Fig. 6, oscillations of this frequency will build up strongly in this circuit.

The coil 152 acts inductively through the coil 156 upon the closed oscillatory circuit comprising the latter coil 156 and the variable condenser 157, which circuit is adjusted to have the same natural period of oscillation as that of the controlling circuit 152—149. Under these conditions, strong oscillations will be built up in the circuit 156—157, which may be used as hereinbefore described, to control a third gaseous detector 165 which in turn may be arranged in a well known manner as shown, to energize any telephone, relay, or other receiving device 168.

It is to be understood that the foregoing description of the operation of the receiving circuits in which reference is made to the diagrammatic representations shown in Figs. 5 and 6 of the electrical oscillations of the system, applies to such operation, only when the amplitude of the oscillations in the various circuits has been built up to a proper degree as a result of the reception of radiant energy having the required periodicities for a suitable interval of time.

In some of the simpler forms of selective receiving systems heretofore used, selectivity is obtained only by high frequency tuning. To achieve this degree of selectivity only the high frequency circuits, such for instance, as open aerial circuit 100, 103, 101, 102 and the closed oscillatory circuit 105, 106 coupled thereto would be required. It is well known, however, that although this simple arrangement of receiving circuits is to a degree selective for weak signals, although not secretly so, yet very intense signals of a frequency different from that to which the system is adjusted to respond are effective to excite disturbing oscillations in the system. This simple arrangement therefore is not adapted for use either when secrecy is of prime importance or when wilful efforts are liable to be made to interrupt the operation of the system.

In order to overcome the limitations just noted, which are inherent in the simpler selective systems such as the one just described, this invention provides a receiving system which not only includes high frequency tuned circuits, such as 101—103 and 105—106, but also includes a pair of cooperating secondary closed oscillatory circuits, such for instance, as circuit 117—125 and 131—132—133 which are tuned to a secondary frequency and which are controlled by the high frequency circuits. It has been found in practice that in order to render these secondary circuits highly selective, as would be indicated by a sufficiently sharp resonance curve, it is necessary to have these secondary circuits tuned to resonate to frequencies far above the commonly known audio frequencies of radio practice. It has also been necessary to have this "secondary frequency" relatively low in comparison with the "radiation frequency", so that through the great dissimilarity in their periodicities, it would be very difficult for the forced oscillations in the radiation frequency circuits to energize the secondary closed circuits 117—125 and 131—132—133. By thus selecting and utilizing a secondary frequency above the upper limit of audibility and between the high radiation frequency and the commonly known audio frequency of radio practice, it has been found possible to obtain a high degree of selectivity in the receiving system, forming a part of this invention.

Although by thus utilizing a high radiation frequency in combination with a suitable secondary frequency, it has been found possible to overcome any adverse effects of any forced oscillation that might be produced in the radiation frequency circuits of the receiving system, it has also been found that such a use of two frequencies is not sufficient in itself to eliminate under extreme conditions, the adverse effect of high-potential disruptive electrical shocks such as are found in the sputtering of an arc system at extremely close range, or as a result of the operation of a highly damped spark system or in the effect of atmospheric and static discharges. Therefore this invention provides means particularly adapted to overcome the adverse effect of high potential disruptive electrical shocks of the character just described.

In considering this phase of the invention, it may be well to bear in mind the fact that power, which may be the power of interference, includes the factors of energy and time. For instance, the unit of horse power is the work done in raising 550 pounds one foot in one second. The work which would have to be accomplished in radio interference would be determined by the amount of initial amplitude which it is necessary that the interfering discharge should have in order to produce potential pulsations of sufficient magnitude to traverse the various circuits. In this relation, however, besides the amplitude of the initial shock, there must be considered the matter of time of its duration. These two functions taken together give us a true conception of the power of interference. By controlling and modifying the factor of time in the device, or by, in other words, necessitating that the interfering energy shall remain at a very high amplitude for a considerable period of time, it is possible to produce conditions under which practically no ordinary type of interfering discharge could affect the system.

In Figs. 7 and 8 is shown a series of curves illustrating diagrammatically the electrical oscillations produced in the various circuits of the receiving system shown in Fig. 4 by powerful interfering electrical shocks of the character hereinbefore described. In case the open aerial circuit 100—103—102 should receive a sudden severe electroradiant shock, the circuit would be caused to oscillate in its natural period as a result of the action of the shocking force, and to continue oscillating after the force had ceased to act upon the circuit. Part of the energy of this oscillation would be imparted to the surrounding space in the form of electromagnetic waves, while a considerable portion of this energy would be handed on to the succeeding portions of the receiving system. Such oscillation of the open aerial circuit as a result of a shock is shown diagrammatically by the curved line in graph M of Fig. 7, and the resulting oscillations produced in the circuit 118, 117, 116 and 110 controlled by the first detector 115 are shown by the curved lines in graph N of Fig. 7, the full heavy line indicating the theoretical oscillations under ideal conditions, and the dotted curved line indicating the approximate actual oscillations.

The closed oscillatory circuit 117—125 which is tuned to the secondary frequency of the system will thus be caused to respond to the shock in oscillations indicated approximately by the curved line in graph P of Fig. 7, thus causing corresponding oscillations in the succeeding closed oscillatory circuit 131, 132, 133, as indicated by the curved line in graph Q of Fig. 7, or of Q Fig. 8 (the curved line in graph Q of Fig. 8 is intended to represent the same oscillations as are represented by the curved line in graph Q of Fig. 7, but the curved line in graph Q of Fig. 8 is shortened horizontally for convenience of illustration). The electrical oscillations produced in the latter circuit 131, 132, 133, as a result of the inductive action of the primary coil 136 upon the secondary coil 133 are shown diagrammatically by the curved line in graph R of Fig. 8, and the combined effect produced in the circuit 131, 132, 133, as a result of the action of the shock and the inductive action of the primary coil 136 is indicated approximately by the curved line in graph S of Fig. 8.

In other words, the curved line in graph S of Fig. 8 is formed by combining the two curved lines in graphs Q and R of Fig. 8. The resulting current oscillations produced in the circuit 153, 152, 151 and 148 controlled by the secondary detector 150 are shown diagrammatically in graph T of Fig. 8, the full heavy line showing the theoretical oscillatory effect and the dotted curved line showing approximately the actual oscillatory effect in this circuit. The oscillatory effect in the oscillatory circuit 156—157 which controls through the third detector 135 the receiving instrument 168, is shown approximately by the full curved line in graph U of Fig. 8, and it is noted that the effect of the shock is here distributed over a comparatively great length of time and proportionately minimized in intensity.

Let it be assumed, for instance, that the shock interference affecting the receiving antenna circuit 100, 101, 102, produces six oscillations in the antenna having sufficient amplitude to energize the succeeding circuits. The period of these oscillations will be that of the antenna, so that each oscillation will have a duration, for instance, of one one-millionth part of a second, and the six oscillations would have a duration of six one-millionths of a second. Now, if the conditions of resonance and coupling of the final cooperating closed circuits 152—149 and 156—157 are such as to require ten oscillations of the strength produced by the ordinary received signal to build up resonance in the circuit 156—157 to a point where the registering or receiving device 168 will function, then if the beat frequency existing in the last mentioned circuits be at a period for instance, of 500 per second, it would require ten five-hundredths of a second or one-fiftieth of a second for the last circuit to be energized so as to cause an operation of the receiving device 168. Since during the reception of signals of normal strength it will take one-fiftieth of a second for the final circuit 156—157 to become energized to the point of effecting the operation of the receiving instrument 168, it is obvious that a shock or deviation which is only six one-millionths of a second would have to possess about 3,333 times the intensity of the ordinary received signal in order to effect any appreciable interference. Furthermore, a random succession of such shocks would be no more effective than a single shock, as each succeeding shock would be just as likely to destroy as to reinforce the preceding shock.

It is therefore evident that this invention provides a system for the transmission of radiant energy, which, even under extreme conditions, is practically proof against interference.

Although only a few of the forms in which this invention may be embodied have been shown and described herein, it is to be understood that the invention is not limited to any specific system or method of operation, but might be applied in various systems and under various conditions of operation without departing from the spirit of the invention or the scope of the appended claims.

Having thus fully described this invention, I claim:

1. The method of wireless signaling, which comprises transmitting radiant energy in such a form as to include a plurality of series of periodic variations having different frequencies respectively, receiving said energy upon a plurality of cooperating receiving devices tuned to said frequencies respectively, causing "beats" in the action of one of said receiving devices and utilizing the action of said "beats" to control a receiving device tuned to said "beats".

2. The method of wireless signaling, which comprises transmitting radiant energy in such a form as to include a plurality of series of periodic variations having different frequencies respectively, receiving said energy upon a plurality of cooperating oscillatory circuits tuned to said frequencies respectively, causing "beats" in one of said circuits by impressing thereon electrical variations having a frequency different from the frequency to which said circuit is tuned, and utilizing the action of said "beats" to produce oscillations in a circuit tuned to the frequency of said "beats".

3. The method of wireless signaling, which comprises transmitting radiant energy in such a form as to include a plurality of series of periodic variations having different frequencies respectively, receiving said energy upon a plurality of successively acting cooperating circuits tuned to said frequencies respectively, causing "beats" in the final one of said circuits by impressing thereon electrical oscillations having a predetermined frequency different from any of the said first mentioned frequencies, utilizing the action of said "beats" to cause the operation of a circuit tuned to the frequency of said beats, and controlling a receiving device as a result of the action of said last mentioned circuit.

4. The method of wireless signaling, which consists in transmitting electroradiant energy in such a form as to include a plurality of series of regular periodic variations having different frequencies respectively, receiving said energy upon a plurality of cooperating successively acting circuits tuned to said frequencies respectively, producing "beats" in the final one of said circuits by impressing thereon electrical variations having a predetermined regular frequency different from the frequency to which said circuit is tuned, and utilizing the action of said "beats" to cause the oscillation of a circuit tuned to the frequency of said "beats".

5. The method of wireless signaling, which comprises generating a series of electroradiant oscillations having a predetermined high frequency, impressing upon said oscillations regular periodic variations having a frequency less than said first mentioned frequency, receiving said oscillations upon a circuit tuned to said first mentioned frequency, causing said circuit to control a secondary circuit tuned to said second mentioned frequency, impressing upon said secondary circuit regular periodic variations having a frequency different from the frequency to which said secondary circuit is tuned to cause "beats" therein, causing said secondary circuit to control a third circuit tuned to the frequency of said "beats", and causing said third circuit to control a receiving device.

6. The method of wireless signaling, which comprises generating a series of electroradiant oscillations having a predetermined high frequency, impressing upon said oscillations regular periodic variations having a frequency less than said first mentioned frequency but substantially above the upper limit of audibility, receiving said oscillations upon a circuit tuned to said first mentioned frequency, causing said circuit to control a secondary circuit tuned to said second mentioned frequency, impressing upon said secondary circuit regular periodic variations having a frequency different from the frequency to which said secondary circuit is tuned to cause "beats" therein, causing said secondary circuit to control a third circuit tuned to the frequency of said "beats", and causing said third circuit to control a receiving device.

7. The method of wireless signaling, which comprises generating a series of electro-radiant oscillations having a predetermined high frequency, impressing upon said oscillations regular periodic variations having a frequency less than said first mentioned frequency, receiving said oscillations upon a circuit tuned to said first mentioned frequency, causing said circuit to control a secondary circuit tuned to said second mentioned frequency, impressing upon said secondary circuit regular electrical oscillations having a frequency different from the frequency to which said secondary circuit is tuned to cause "beats" therein, causing said secondary circuit to control a third circuit tuned to the frequency of said "beats", and causing said third circuit to control a receiving device.

8. The method of wireless signaling, which comprises generating a series of electroradiant oscillations having a predetermined high frequency, impressing upon said oscillations regular periodic variations having a frequency less than said first mentioned frequency but above the upper limit of audibility, receiving said oscillations upon a circuit tuned to said first mentioned frequency, causing said circuit to control a secondary circuit tuned to said second mentioned frequency, impressing upon said secondary circuit regular electrical oscillations having a frequency different from the frequency to which said secondary circuit is tuned to cause "beats" therein, causing said secondary circuit to control a third circuit tuned to the frequency of said "beats", and causing said third circuit to control a receiving device.

9. The method of receiving radiant energy, which consists in exciting a receiving circuit tuned to a predetermined frequency as a result of the action of radiant oscillations causing said circuit to set up oscillations in a secondary circuit tuned to a frequency lower than said first mentioned frequency, causing "beats" in said secondary circuit by impressing thereon regular periodic variations having a frequency different from the frequency to which said secondary circuit is tuned, and utilizing the combined oscillations in said secondary circuit to set up oscillations in a circuit tuned to the frequency of said "beats" and causing said last mentioned circuit to control a receiving device.

10. A system for the transmission of energy, comprising means for transmitting radiant energy in such a form as to include a plurality of series of periodic variations having different frequencies respectively, and means for receiving said energy including a plurality of cooperating circuits tuned to said frequencies respectively, means for producing "beats" in one of said circuits by impressing thereon electrical variations having a frequency different from the frequency to which said circuit is tuned, a circuit tuned to the frequency of said "beats" and arranged to be caused to oscillate in response to said "beats", and a receiving device controlled by said last mentioned circuit.

11. A system for the transmission of radiant energy, including means for transmitting radiant oscillations having a pedetermined high frequency, means for regularly varying said oscillations periodically at a frequency below said first mentioned frequency, and means for receiving said oscillations including a circuit tuned to said first mentioned frequency, a secondary circuit controlled by said first mentioned circuit and tuned to said second mentioned frequency, means for producing "beats" in said secondary circuit by impressing thereon electrical oscillations having a frequency different from the frequency to which said second mentioned circuit is tuned, a third circuit controlled by said secondary circuit and tuned to the frequency of said "beats", and a receiving device arranged to be controlled by said third circuit.

12. A system for the transmission of radiant energy, including means for transmitting radiant oscillations having a predetermined high frequency, means for regularly varying said oscillations periodically at a frequency below said first mentioned frequency above the upper limit of audibility, and means for receiving said oscillations including a circuit tuned to said first mentioned frequency, a secondary circuit controlled by said first mentioned circuit and tuned to said second mentioned frequency, means for producing "beats" in said secondary circuit by impressing thereon electrical oscillations having a frequency different from the frequency to which said second mentioned circuit is tuned, a third circuit controlled by said secondary circuit and tuned to the frequency of said "beats", and a receiving device arranged to be controlled by said third circuit.

13. A receiving system for radiant energy, comprising a circuit tuned to respond to radiant oscillations having a high frequency, a secondary circuit controlled by said first mentioned circuit and tuned to a frequency lower than said first mentioned frequency, means for producing electrical "beats" in said secondary circuit by impressing thereon electrical oscillations having a predetermined frequency different from the frequency to which said secondary circuit is tuned, a third circuit tuned to oscillate in response to said "beats", and a receiving device controlled by said third circuit.

14. A receiving system for radiant energy, comprising a circuit tuned to respond to radiant oscillations having a high frequency, a secondary circuit controlled by said first mentioned circuit and tuned to a frequency lower than said first mentioned frequency but substantially above the upper limit of audibility, means for producing electrical "beats" in said secondary circuit by impressing thereon electrical oscillations having a predetermined frequency different from the frequency to which said secondary circuit is tuned, a third circuit tuned to oscillate in response to said "beats", and a receiving device controlled by said third circuit.

15. A receiving system for radiant energy, comprising an open aerial circuit electrically tuned to respond to a predetermined high frequency, a secondary circuit controlled by said first mentioned circuit and electrically tuned to respond to a frequency less than said first mentioned frequency, means inductively connected to said secondary circuit for producing "beats" therein by impressing thereon electrical oscillations having a frequency different from the frequency to which said secondary circuit is tuned, a third circuit controlled by said secondary circuit and electrically tuned to the frequency of said "beats", and a receiving device controlled by said third circuit.

16. A receiving system for radiant energy, comprising an open aerial circuit electrically tuned to respond to a predetermined high frequency, a secondary circuit controlled by said first mentioned circuit and electrically tuned to respond to a frequency less than said first mentioned frequency but substantially above the upper limit of audibility, means inductively connected to said secondary circuit for producing "beats" therein by impressing thereon electrical oscillations having a frequency different from the frequency to which said secondary circuit is tuned, a third circuit controlled by said secondary circuit and electrically tuned to the frequency of said "beats", and a receiving device controlled by said third circuit.

17. A receiving system for radiant energy, comprising an open aerial circuit tuned to respond to a predetermined high frequency, a primary detector controlled by said circuit, a closed oscillatory circuit controlled by said detector and tuned to a frequency less than said first mentioned frequency, a secondary oscillatory circuit controlled by said second mentioned circuit and tuned to said second mentioned frequency, means for producing "beats" in said secondary circuit by impressing thereon electrical oscillations having a predetermined frequency different from either of said first mentioned frequencies, a secondary detector controlled by said secondary circuit, a third oscillatory circuit tuned to said second mentioned frequency and controlled by said secondary detector, and a receiving device controlled by said third circuit.

18. A receiving system for radiant energy, comprising an open aerial circuit tuned to respond to a predetermined high frequency, a primary detector controlled by said circuit, a closed oscillatory circuit controlled by said detector and tuned to a frequency less than said first mentioned frequency but substantially above the upper limit of audibility, a secondary oscillatory circuit controlled by said second mentioned circuit and tuned to said second mentioned frequeny, means for producing "beats" in said secondary circuit by impressing thereon electrical oscillations having a predetermined frequency different from either of said first mentioned frequencies, a secondary detector controlled by said secondary circuit, a third oscillatory circuit tuned to said second mentioned frequency and controlled by said secondary detector, and a receiving device controlled by said third circuit.

19. A system for the transmission of radiant energy, comprising means for transmitting radiant energy in a series of groups of oscillations having a predetermined high wave frequency and a predetermined group frequency less than said wave frequency, and means for receiving said oscillations comprising a circuit tuned to the frequency of said oscillations, a secondary circuit controlled by said first mentioned circuit and tuned to said group frequency, means for producing "beats" in said secondary circuit by impressing thereon electrical oscillations having a frequency different from said group frequency, a third circuit controlled by said secondary circuit and tuned to the frequency of said "beats", and a receiving device controlled by said third circuit.

20. A system for the transmission of radiant energy, comprising means for transmitting radiant energy in a series of groups of oscillations having a predetermined high wave frequency and a predetermined group frequency less than said wave frequency but substantially above the upper limit of audibility, and means for receiving said oscillations comprising a circuit tuned to the frequency of said oscillations, a secondary circuit controlled by said first mentioned circuit and tuned to said group frequency, means for producing "beats" in said secondary circuit by impressing thereon electrical oscillations having a frequency different from said group frequency, a third circuit controlled by said secondary circuit and tuned to the frequency of said "beats", and a receiving device controlled by said third circuit.

21. The method of radio telephony, which comprises transmitting radiant energy in such a form as to include a plurality of series of periodic variations having different frequencies respectively, impressing upon said variations a series of irregular variations corresponding to sound waves, receiving said energy upon a plurality of cooperating receiving devices tuned to said frequencies respectively, causing "beats" having a frequency above the frequency of sound waves audible to the ordinary operator in the action of one of said receiving devices, and utilizing the action of said "beats" to control a receiving device tuned to said "beats", and causing said last mentioned device to control a telephonic receiving instrument.

22. The method of wireless signaling, which comprises transmitting radiant energy in such a form as to include a plurality of series of periodic variations having different frequencies respectively and having a plurality of said frequencies substantially above audibilty, receiving said energy upon a plurality of cooperating receiving devices tuned to said frequencies respectively, causing "beats" in the action of one of said receiving devices, and utilizing the action of said "beats" to control the receiving devices tuned to said beats.

23. The method of wireless signaling, which comprises transmitting radiant energy in such a form as to include a plurality of series of periodic variations having different frequencies respectively and having each of said frequencies substantially above audibility, receiving said energy upon a plurality of cooperating receiving devices, causing periodic "beats" having a frequency substantially above audibility in the action of one of said receiving devices, and utilizing the action of said beats to control a receiving device.

24. The method of wireless signaling, which comprises transmitting radiant energy in such a form as to include a plurality of series of periodic variations having different frequencies respectively and having each of said frequencies substantially above audibility, receiving said energy upon a plurality of cooperating receiving devices, causing periodic "beats" having a frequency substantially above audibility in the action of one of said receiving devices, and utilizing the action of said "beats" to control a receiving device tuned to said "beats".

25. The method of wireless signaling, which comprises transmitting radiant energy in such a form as to include a plurality of series of periodic variations having different frequencies respectively, modifying one of said series of periodic variations from time to time at the will of an operator, receiving said energy upon a plurality of cooperating receiving devices tuned to said frequencies respectively, causing "beats" in the action of one of said receiving devices, and utilizing the action of said "beats" to control a receiving device tuned to said "beats".

26. The method of wireless signaling, which comprises transmitting radiant energy in such a form as to include a plurality of series of periodic variations having different frequencies respectively, modifying one of said series of periodic variations from time to time at the will of an operator, receiving said energy upon a plurality of cooperating receiving devices tuned to said frequencies respectively, causing "beats" in the action of one of said receiving devices as the result of the action of energy received from a source other than the source of said radiant energy, and utilizing the action of said "beats" to control a receiving device tuned to said "beats".

27. The method of wireless signaling, which comprises transmitting radiant energy in such form as to include a plurality of series of periodic variations having different frequencies respectively and having a plurality of said frequencies substantially above audibility, modifying one of said series of periodic variations from time to time at the will of an operator, receiving said energy upon a plurality of cooperating receiving devices tuned to said frequencies respectively, causing "beats" in the action of one of said receiving devices, and utilizing the action of said "beats" to control a receiving device tuned to said "beats".

28. The method of wireless signaling, which comprises transmitting radiant energy in such form as to include a plurality of series of periodic variations having different frequencies respectively and having a plurality of said frequencies substantially above audibility, modifying one of said series of periodic variations from time to time at the will of an operator, receiving said energy upon a plurality of cooperating receiving devices tuned to said frequencies respectively, causing "beats" in the action of one of said receiving devices as the result of the action receiving devices as the result of the action of energy received from a source other than the source of said radiant energy, and utilizing the action of said "beats" to control a receiving device tuned to said "beats".

29. The method of wireless signaling, which comprises transmitting radiant energy in such a form as to include a plurality of series of periodic variations having different frequencies respectively and having a plurality of said frequencies substantially above audibility, receiving said energy upon a plurality of cooperating receiving circuits tuned to said frequencies respectively, causing "beats" in the action of one of said receiving circuits, and utilizing the action of said "beats" to control the receiving circuits tuned to said beats.

30. The method of wireless signaling, which comprises transmitting radiant energy in such a form as to include a plurality of series of periodic variations having different frequencies respectively and having each of said frequencies substantially above audibility, receiving said energy upon a plurality of cooperating receiving circuits, causing periodic "beats" having a frequency substantially above audibility in the action of one of said receiving circuits, and utilizing the action of said "beats" to control a receiving circuit.

31. The method of wireless signaling, which comprises transmitting radiant energy in such a form as to include a plurality of series of periodic variations having different frequencies respectively and having each of said frequencies substantially above audibility, receiving said energy upon a plurality of cooperating receiving circuits, causing periodic "beats" having a frequency substantially above audibility in the action of one of said receiving circuits, and utilizing the action of said "beats" to control a receiving circuit tuned to said "beats".

32. The method of wireless signaling, which comprises transmitting radiant energy in such a form as to include a plurality of series of periodic variations having different frequencies respectively, modifying one of said series of periodic variations from time to time at the will of an operator, receiving said energy upon a plurality of cooperating receiving circuits tuned to said frequencies respectively, causing "beats" in the action of one of said receiving circuits, and utilizing the action of said "beats" to control a receiving circuit tuned to said "beats".

33. The method of wireless signaling, which comprises transmitting radiant energy in such a form as to include a plurality of series of periodic variations having different frequencies respectively, modifying one of said series of periodic variations from time to time at the will of an operator, receiving said energy upon a plurality of cooperating receiving circuits tuned to said frequencies respectively, causing "beats" in the action of one of said receiving circuits as the result of the action of energy received from a source other than the source of said radiant energy, and utilizing the action of said "beats" to control a receiving circuit tuned to said "beats".

34. The method of wireless signaling, which comprises transmitting radiant energy in such a form as to include a plurality of series of periodic variations having different frequencies respectively and having a plurality of said frequencies substantially above audibility, modifying one of said series of periodic variations from time to time at the will of an operator, receiving said energy upon a plurality of cooperating receiving circuits tuned to said frequencies respectively, causing "beats" in the action of one of said receiving circuits, and utilizing the action of said "beats" to control a receiving circuit tuned to said "beats".

35. The method of wireless signaling, which comprises transmitting radiant energy in such form as to include a plurality of series of periodic variations having different frequencies respectively and having a plurality of said frequencies substantially above audibility, modifying one of said series of periodic variations from time to time at the will of an operator, receiving said energy upon a plurality of cooperating receiving circuits tuned to said frequencies respectively, causing "beats" in the action of one of said receiving circuits as the result of the action of energy received from a source other than the source of said radiant energy, and utilizing the action of said "beats" to control a receiving circuit tuned to said "beats".

36. The method of wireless signaling, which comprises transmitting radiant energy in such a form as to include a plurality of series of periodic variations having different frequencies respectively, receiving said energy upon a plurality of cooperating oscillatory circuits tuned to said frequencies respectively, causing "beats" in one of said circuits by impressing therein electrical variations having a frequency different from the frequency to which said circuit is tuned, and utilizing the action of said "beats" to produce oscillations in a circuit tuned to the frequency of said "beats".

37. The method of radio telephony, which comprises transmitting radiant energy in such a form as to include a plurality of series of periodic variations having different frequencies respectively, impressing upon one of said series of variations a series of irregular variations corresponding to sound waves produced by the voice of an operator, receiving said energy upon a plurality of cooperating receiving circuits tuned to said frequencies respectively, and arranged to act jointly and successively, causing electrical "beats" having a frequency substantially above audibility in the action of one of said receiving circuits, and utilizing the action of said "beats" to control a receiving circuit tuned to said "beats".

38. The method of radio telephony, which comprises transmitting radiant energy in such a form as to include a plurality of series of periodic variations having different frequencies respectively, impressing upon one of said series of variations a series of irregular variations corresponding to sound waves produced by the voice of an operator, receiving said energy upon a plurality of cooperating receiving circuits tuned to said frequencies respectively and arranged to act jointly and successively, causing electrical "beats" having a frequency substantially above audibility in the action of one of said receiving circuits, utilizing the action of said "beats" to control a receiving circuit, and causing said last-mentioned circuit to control a telephonic receiving instrument.

39. The method of radio telephony, which comprises transmitting radiant energy in such a form as to include a plurality of series of periodic variations having different frequencies respectively and having each of said frequencies substantially above audibility, impressing upon one of said series of variations a series of irregular variations corresponding to sound waves produced by the voice of an operator, receiving said energy upon a plurality of cooperating receiving circuits tuned to said frequencies respectively and arranged to act jointly and successively, causing electrical "beats" having a frequency substantially above audibility in the action of one of said receiving circuits, and utilizing the action of said "beats" to control a receiving circuit tuned to said "beats".

40. The method of radio telephony, which comprises transmitting radiant energy in such a form as to include a plurality of series of periodic variations having different frequencies respectively and having each of said frequencies substantially above audibility, impressing upon one of said series of variations a series of irregular variations corresponding to sound waves produced by the voice of an operator, receiving said energy upon a plurality of cooperating receiving circuits tuned to said frequencies respectively and arranged to act jointly and successively, causing electrical "beats" having a frequency substantially above audibility in the action of one of said receiving circuits, utilizing the action of said beats to control a receiving circuit, and causing said last-mentioned circuit to control a telephonic receiving instrument.

41. The method of transmitting radiant energy, which consists in generating electrical impulses having impressed thereon a series of periodic modifications, causing said impulses to act upon a radiating circuit and thereby cause said circuit to emit radiant oscillations having impressed thereon a corresponding series of modifications, causing said oscillations to produce corresponding electrical oscillations in a receiving circuit, rectifying said last-mentioned oscillations and causing said rectified oscillations to produce electrical oscillations having the same frequency as the frequency of said periodic modifications, and varying said first-mentioned periodic modifications from time to time to form signals, while maintaining the frequency of said first-mentioned impulses substantially constant.

42. The method of transmitting radiant energy, which consists in generating electrical impulses having impressed thereon a series of periodic modifications, causing said impulses to act upon a radiating circuit and thereby cause said circuit to emit radiant oscillations having impressed thereon a corresponding series of modifications, causing said oscillations to produce corresponding electrical oscillations in a receiving circuit, rectifying said last-mentioned oscillations and causing said rectified oscillations to produce electrical oscillations having the same frequency as the frequency of said periodic modifications, and varying said first-mentioned periodic modifications from time to time by and in accordance with sound waves to form signals, while maintaining the frequency of said first-mentioned impulses substantially constant.

43. The method of wireless signaling which consists in generating high frequency radiant oscillations, impressing upon said oscillations a series of periodic variations, receiving said oscillations and variations in such a manner as to cause electrical oscillations to be produced as a result of the action of the received radiant oscillations and variations, and having a frequency equal to the frequency of said periodic variations, producing electrical "beats" in said electrical oscillations controlling a receiving device as a result of the action of said "beats", and modifying said series of periodic variations from time to time to form signals.

44. The method of telephony which consists in transmitting energy in such a form as to include a plurality of series of periodic impulses having different frequencies respectively, and all of said frequencies being substantially outside of the range of audibility, producing in one of said series of periodic impulses a series of modifications corresponding to sound waves, selectively receiving said plurality of series of impulses upon a plurality of cooperating receiving devices tuned to said frequencies respectively, and producing sound waves as a result of the action of said modifications.

45. The method of telephony which consists in transmitting energy in such a form as to include a plurality of series of periodic impulses having different frequencies respectively, and all of said frequencies being substantially outside of the range of audibility, producing in one of said series of periodic impulses a series of modifications by and in accordance with sound waves, selectively receiving said plurality of series of impulses upon a plurality of cooperating receiving devices tuned to said frequencies respectively, and producing sound waves as a result of t'e action of said modifications.

46. A system for signaling including means for transmitting oscillations having a predetermined high frequency, means for varying said oscillations periodically at a frequency different from said first-mentioned frequency, and means for receiving said oscillations and variations including a circuit responsive to said first-mentioned frequency, a secondary circuit controlled by said first-mentioned circuit and selectively responsive to impulses of said second-mentioned frequency, and means for producing electrical "beats" in said secondary circuit, and means for varying said second-mentioned frequency at the will of an operator for the purpose of signaling while maintaining said first-mentioned frequency substantially constant.

47. In apparatus for the reception of trains of electro-magnetic impulses of radio frequency having a high, substantially inaudible group frequency, the combination with an antenna circuit, of a local circuit dynamically associated therewith and tuned to the radio frequency of said impulses, means including a second local circuit for detecting and for tuning to the group frequency of the incoming impulses, a local receiving circuit dynamically associated with said second local circuit, and means for also impressing upon said receiving circuit impulses of a frequency near said group frequency, whereby beats of audible frequency are produced in said receiving circuit.

48. In apparatus for the reception of trains of electro-magnetic impulses of radio frequency having a high, substantially inaudible group frequency, the combination with an antenna circuit, tuned to said radio frequency, of means including a local circuit for detecting and for tuning to the group frequency of the incoming impulses, a receiving circuit dynamically associated with said local circuit, and additional means for continuously impressing impulses upon said receiving circuit of a frequency near said group frequency, whereby beats of audible frequency may be produced in said receiving circuit.

Signed at New York in the county of New York and State of New York this 13th day of March, A. D. 1917.

JOHN HAYS HAMMOND, Jr.